United States Patent
Dzuban et al.

(10) Patent No.: US 7,636,572 B1
(45) Date of Patent: Dec. 22, 2009

(54) MOBILE COMMUNICATION SYSTEM FOR CONTROLLING A CONNECTION SETUP

(75) Inventors: Stanislav Dzuban, Vienna (AT); Uwe Föll, Falkensee (DE); Frank Erfurt, Kleinmachnow (DE); Manfred Leitgeb, Gramatneusiedl (AT); Alexander Niepel, München (DE); Uve Reimer, Berlin (DE); Jens Schendel, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/763,309

(22) PCT Filed: Aug. 27, 1999

(86) PCT No.: PCT/DE99/02696

§ 371 (c)(1),
(2), (4) Date: May 7, 2001

(87) PCT Pub. No.: WO00/13445

PCT Pub. Date: Mar. 9, 2000

(30) Foreign Application Priority Data

Aug. 27, 1998 (DE) .................. 198 39 016

(51) Int. Cl.
*H04Q 7/20* (2006.01)
(52) U.S. Cl. ............... 455/445; 455/433; 455/435.1
(58) Field of Classification Search .............. 455/413, 455/445, 415, 417, 432.1, 433, 435.1, 435.3, 455/554.1
See application file for complete search history.

(56) References Cited

U.S. PATENT DOCUMENTS

| 5,504,804 A | 4/1996 | Widmark et al. ............... 379/63 |
| 6,173,182 B1 * | 1/2001 | Cha ........................ 455/435.1 |
| 2002/0163999 A1 * | 11/2002 | Farris et al. .............. 379/88.02 |

FOREIGN PATENT DOCUMENTS

| WO | WO 98/59503 | 12/1998 |
| WO | WO 99/23836 | 5/1999 |

OTHER PUBLICATIONS

PCT, International Search Report, Examiner Johannes Ligtvoet, Feb. 10, 2000, 7 pp.
Smith, David. "An Introduction to SGM Enhancements for Operator Specific Services (Camel)," The Institution of Electrical Engineers, London, UK, 1996, pp. 1-9.
Office Action in Application No. JP2000-571108, dated Dec. 12, 2008.

* cited by examiner

*Primary Examiner*—Sam Bhattacharya
(74) *Attorney, Agent, or Firm*—Fish & Richardson P.C.

(57) ABSTRACT

Controlling setting-up a connection in a mobile communication system includes storing, in at least one subscriber database, subscriber-oriented data for a subscriber registered in a home mobile radio network, entering the subscriber-oriented data in a subscriber database when the subscriber moves, and setting-up a connection for the subscriber with a mobile station using a mobile switching center coupled to the subscriber database.

28 Claims, 1 Drawing Sheet

MOBILE COMMUNICATION SYSTEM FOR CONTROLLING A CONNECTION SETUP

CLAIM TO PRIORITY

This application claims priority from German application number 19839016.5 filed on Aug. 27, 1998 and from Patent Cooperation Treaty (PCT) application no. PCT/DE99/02696 filed on Aug. 27, 1999.

TECHNICAL FIELD

The invention relates to a method and a mobile communication system for controlling the setting-up of a connection.

BACKGROUND

Mobile subscribers are able to move freely with their mobile stations even beyond the network boundaries of their home mobile radio network (roaming). However, when a subscriber is roaming into another visited mobile radio network, he cannot easily use call numbers well known to him from his home mobile radio network such as, for example, service numbers, hotline number, mailbox number, etc. since he is subject to the numbering plan applicable in the network. Even if, in principle, it is possible to reach the call number in the other network, the mobile subscriber usually dials the call number known to him from his network in order to initiate the call. However, this procedure is unsuccessful so the mobile subscriber must take elaborate additional measures.

It is known that mobile communication systems use one or more subscriber databases (home location registers), in which the subscriber data are in each case located in their area of responsibility because of their current location.

SUMMARY

It is an advantage of the present invention to specify a method and a mobile communication system for controlling the setting-up of a connection and also which enables the subscriber to utilize familiar call numbers outside of the subscriber's home mobile radio network.

On the basis of the fact that subscriber-oriented data of each mobile subscriber registered in his home mobile radio network is stored in at least one subscriber database and, when the subscriber moves, is entered in a corresponding subscriber database in accordance with an updating procedure, the subject matter of the invention provides that a subscriber number profile with call numbers generally valid for all registered mobile subscribers is stored additionally in the subscriber database of the home mobile radio network and, when the respective subscriber moves into the visited mobile radio network, is also transmitted in the updating procedure for storage in the corresponding subscriber database. Furthermore, the mobile switching center in the visited mobile radio network compares the call numbers of the subscriber number profile with the called party address for a mobile originated call which is initiated with a called party address dialed by the mobile subscriber. When the call numbers match, a connection is set up to a service control point which translates the called party address also transmitted into a new called party address. The new call party address is sent back to the mobile switching center for further use in setting-up of a connection.

The subscriber number profile with generally valid call numbers for all mobile subscribers registered in the home network according to the invention has the result that the call numbers familiar to the mobile subscriber can be called up not only in his home network but also in any other network in which he happens to be located, without elaborate additional measures by the subscriber. The subscriber behaves as if he were in his home network with respect to the dialing of the desired call numbers. The storage of the subscriber number profile applies to all subscribers so that it does not need to be specified, stored and loaded in the case of an update for each individual subscriber. The subscriber number profile is automatically supplied in addition to the subscriber-oriented data with each update of the location due to roaming into another network.

According to an advantageous development of the invention, the called party address with the internal network call number format is translated into the new called party address with an international call number format by a service control point. This results in a successful, internationally valid identification of the call number by the service control point in the connection set-up without the subscriber noticing this or even having had to carry out measures for this. This call number, which is only valid in the network, automatically becomes an international number.

It is also advantageous if the generally valid call numbers in the subscriber number profile are optionally stored either with the complete number of call number digits or with an abbreviated number of call number digits and are in each case compared with the corresponding number of call number digits of the called party address. Storing the abbreviated call numbers offers the advantage of reducing the required storage space in the respective subscriber databases.

According to another development of the invention, a service key and/or a service control point address of the service control point are stored in the subscriber number profile in addition to the generally valid call numbers and are also transmitted. It is thus possible also to supply additional information, which leads to a faster and/or simpler connection set-up by the mobile switching center.

The mobile communication system according to the invention exhibits memory means in the subscriber database of the home mobile radio network for additional storage of a subscriber number profile with generally valid call numbers for all registered mobile subscribers and control means in the subscriber database for transmitting the subscriber number profile in the updating procedure when the respective subscriber moves into the visited mobile radio network, and memory means in the corresponding subscriber database for storing the subscriber number profile also transmitted. Furthermore, the mobile communication system includes control means for comparing the call numbers of the subscriber number profile with a called party address dialed by the mobile subscriber for a mobile originated call, which is initiated with the called party address, and for setting up a connection to a service control point when they match. In addition, the service control point exhibits control means for translating the called party address also transmitted into a new called party address and for sending the new called party address back to the mobile switching center for further connection set-up.

The invention is explained in greater detail with reference to an exemplary embodiment.

DETAILED DESCRIPTION

Figure 1:
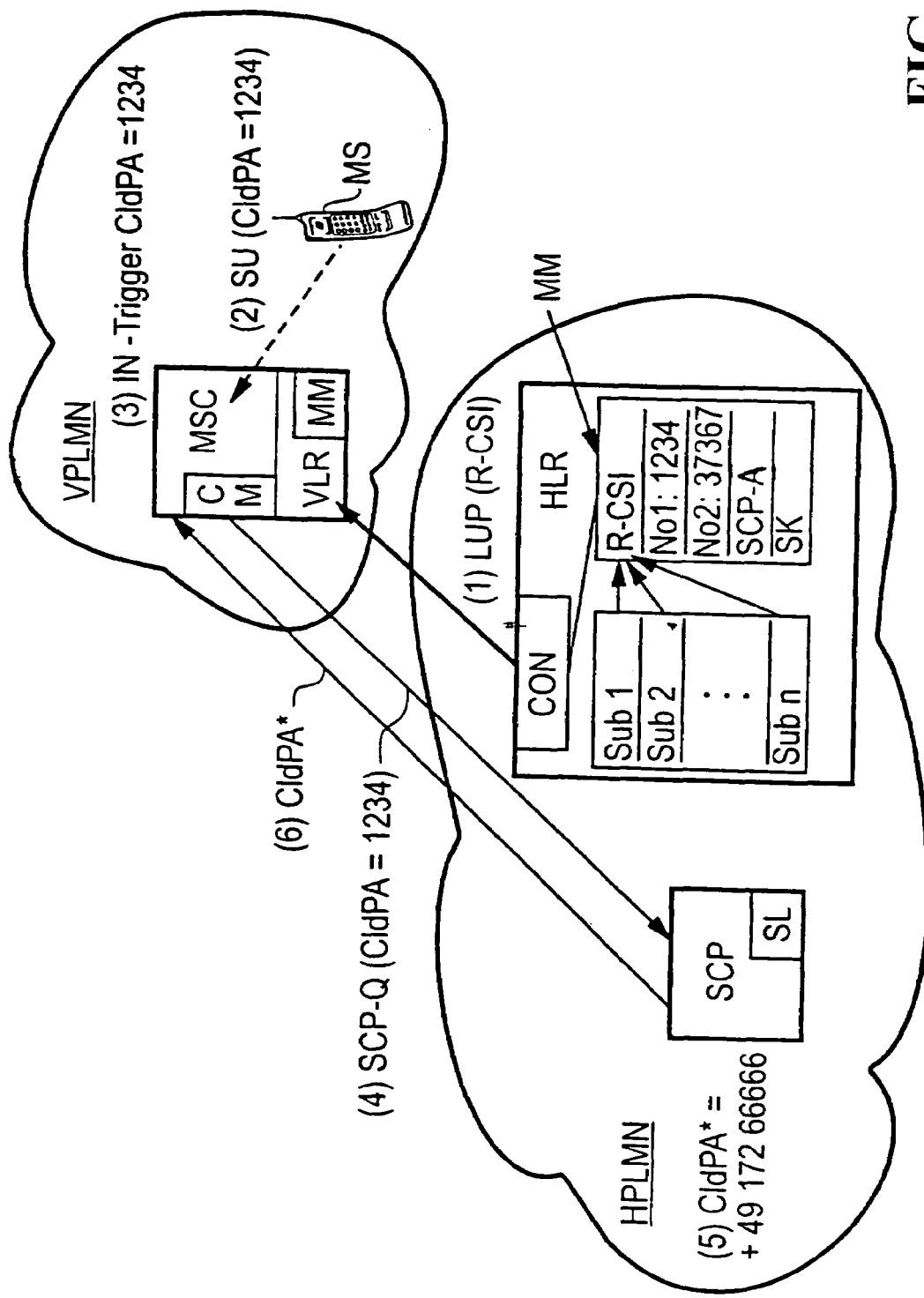
FIG. 1 shows a block diagram of a mobile communication system for controlling the setting-up of a connection.

The example of FIG. 1 is based on a system according to the GSM Standard but the invention is not restricted to this standard. From the point of view of a mobile subscriber who uses a mobile station (MS) for initiating mobile originated calls and receiving mobile terminated calls, the mobile communication system comprises a home mobile radio network HPLMN and a visited mobile radio network VPLMN. In this arrangement, an identity of the mobile subscriber is permanently stored with his subscriber-oriented data in a home location register HLR of the home mobile radio network HPLMN for the duration of his registration. Because of his mobility, the identity is also stored with his subscriber-oriented data in a visitor location register VLR of the visited mobile radio network VPLMN for the duration of a temporary stay in another radio coverage area. The switching in the radio coverage area is handled by a mobile switching center MSC, which controls the connection set-up for the calls which can be received and initiated by subscribers or terminals with associated data in the visitor location register VLR. The mobile switching center MSC and the home location register HLR have a control unit CM or, respectively, CON and the home location register HLR and the visitor location register VLR in each case have a memory means MM. The mobile switching center MSC can set up a connection to a service control point SCP of an intelligent network IN when an IN trigger is present in the call processing. The service control point SCP has a service logic SL for controlling the IN services.

To control the setting-up of a connection according to the invention, a subscriber number profile R-CSI (roaming CAMEL service information) with generally valid call numbers for all registered mobile subscribers Sub1, Sub2 .... Subn, e.g. No1=1234 and No2=37367, is additionally stored in the home location register HLR of the home mobile radio network HPLMN in a step (1), and when the respective subscriber moves into the visited mobile radio network VPLMN, also transmitted in the updating procedure LUP (location update) for storage in the visitor location register VLR. Storage in the two subscriber databases in each case takes place in the memory means MM, the control unit CON of the home location register HLR initiating the reading-out of the memory means MM and the transmission of the subscriber number profile R-CSI in the updating procedure LUP. In the memory means MM of the home location register HLR, further information is preferably stored such as, e.g., a service key (SK) and/or a service control point address (SCP-A) of the service control point SCP. This additional information, which is defined and administered in a generally valid manner for all subscribers Sub1, Sub2 .... Subn stored in the home location register HLR, can also be transmitted in the updating procedure in addition to the subscriber-oriented data.

The generally valid call numbers No1, No2 stored in the subscriber number profile R-CSI are may be abbreviated call numbers, which are familiar to the subscriber in his home mobile radio network HPLMN. Due to the invention, a certain service (service number) can be used or a mailbox can be called up even in the other network VPLMN, even if a different numbering plan exists there, when an abbreviated call number known to the subscriber is dialed. The generally valid call numbers No1, No2 in the subscriber number profile R-CSI are optionally stored with the complete number of call number digits or with an abbreviated number of call number digits in the memory means MM.

According to the invention, the mobile switching center MSC in the visited mobile radio network VPLMN compares the call numbers No1, No2 of the subscriber number profile R-CSI with the called party address C1dPA for a mobile originated call which is initiated by the mobile subscriber with a message SU (setup) and a dialed called party address C1dPA=1234—for example an abbreviated call number—according to step (2) in the present example. Since a match between the call number No1 and the called party address C1dPA, having in each case the digit combination 1234, exists in the present example, this match acts as IN trigger mechanism in the mobile switching center—see step (3)—so that, in consequence, the call is routed from the mobile switching center MSC to the service control point SCP. Routing according to step (4) contains a query message SCP-Q with the called party address C1dPA=1234- or, respectively, the abbreviated call number No1=1234- to the service control point SCP, the service logic SL of which translates the received called party address into a new called party address C1dPA*=+49 172 66666—see step (5). After that, the service control point SCP or, respectively, its service logic SL sends the new called party address C1dPA*=+49 172 66666 back to the mobile switching center MSC for continuing the connection set-up—see step (6). In the present example, the abbreviated call number C1dPA=1234 which arrived at the service control point SCP and which only has validity in the home mobile radio network HPLMN with an internal network call number format in this digit combination, was translated into a long call number C1dPA*=+4917266666 with an international call number format including the country code (+49) and the network code (172) which also has validity in the visited mobile radio network VPLMN.

It is assumed that the subscriber-oriented data for the mobile subscriber may also contain service data which provides for the utilization of an IN service and thus the routing of the call to a service point—possibly a different one from the service control points (SCP). In this case, the service data is loaded into the visitor location register VLR by the home location register and is evaluated by the mobile switching center MSC. Because of the presence of an IN trigger, the mobile switching center initially sets up the connection to the IN service control point. After this connection has been set up, the call numbers of the subscriber number profile R-CSI are assessed with respect to a match with the called party address C1dPA and a further connection is set up according to the above procedure to the service control point SCP shown. Sequentializing the call processing ensures that a number of contacts to service control points SCP, or, respectively, service logics SL are supported in succession during the connection set-up. As a result, it is advantageously possible to combine an IN service which can be individually used and entered for the mobile subscriber with the IN trigger mechanism according to the call numbers of the subscriber number profile which are generally valid for all subscribers according to the invention.

What is claimed is:

1. A method of controlling setting-up a connection in a mobile communication system, comprising:

storing, in at least one subscriber database, subscriber-oriented data for a subscriber registered in a home mobile radio network;

entering the subscriber-oriented data in another subscriber database when the subscriber moves; and setting-up a connection for the subscriber with a mobile station using a mobile switching center in a visited mobile radio network, the mobile switching center being coupled to another subscriber database;

wherein:

a subscriber number profile, which contains valid call numbers for all registered subscribers, is stored in another subscriber database and, when the subscriber moves into the visited mobile radio network, the subscriber number profile is also stored in the subscriber database; and the mobile switching center compares the call numbers from the subscriber number profile with a called party address for a call which is initiated by the subscriber and, when a call number matches the called party address, a connection is set up to a service control point which translates the called party address into a new called party address and sends the new called party address to the mobile switching center to set-up a connection.

2. The method of claim 1, wherein the called party address includes an internal network call number format that is translated, by the service control point, into the new called party address, the new called party address having an international call number format.

3. The method of claim 2, wherein, in addition to the valid call numbers in the subscriber number profile the subscriber profile contains one of a service key and a service control point address of the service control point.

4. The method of claim 1, wherein, in addition to the valid call numbers, the subscriber number profile contains one of a service key and a service control point address of the service control point.

5. The method of claim 1, wherein abbreviated call numbers are stored as valid call numbers in the subscriber number profile.

6. The method of claim 5, wherein a service is used by the subscriber by dialing an abbreviated call number.

7. The method of claim 6, wherein a mailbox is called by the subscriber by dialing an abbreviated call number.

8. The method of claim 1, wherein a mailbox is called by the subscriber by dialing an abbreviated call number.

9. The method of claim 1, wherein the valid call numbers in the subscriber number profile are stored with one of a complete number of call number digits and an abbreviated number of call number digits, and wherein the valid call numbers are each compared with a corresponding number of call number digits of the called party address.

10. The method of claim 1, wherein:
the subscriber-oriented data comprises service data; and
the mobile switching center evaluates the service data, sets up a call to a service control point, evaluates call numbers of the subscriber number profile with respect to the called party address, and sets up a further connection to a service control point.

11. The method of claim 1, wherein the service control point is part of an intelligent network.

12. The method of claim 1, wherein storing the subscriber-oriented data and the subscriber number profile in another subscriber database when the subscriber moves into a visited mobile radio network further comprises:
executing an update procedure in a computer control unit in at least one of the home mobile radio network and the visited mobile radio network.

13. The method of claim 1, wherein the subscriber number profile contains data for all subscribers registered in the home mobile radio network.

14. The method of claim 1, wherein the subscriber number profile contains a plurality of valid call numbers.

15. A mobile communication system for controlling a call connection, comprising:
a first memory means for storing subscriber-oriented data and a subscriber number profile having a valid call number for a subscriber registered in a home mobile radio network; and
second memory means for storing the subscriber-oriented data and the subscriber number profile when the subscriber moves into a visited mobile radio network;
a mobile switching center coupled to the second memory means for setting up connections with the subscriber's mobile station, the mobile switching center comprising:
memory means for storing a subscriber number profile having call numbers that are valid for all registered mobile subscribers, and control means for transmitting the subscriber number profile in accordance with the updating procedure when the subscriber moves into a visited mobile radio network; and
control means for comparing call numbers from the subscriber number profile with a called party address sent by the mobile station, and for setting up a connection to a first service control point when the called party address matches a valid number in the subscriber number profile; and
control means in the first service control point for translating the called party address into a new called party address and for sending the new called party address back to the mobile switching center for setting up a new call connection with the mobile station.

16. The system of claim 15, wherein the called party address includes an internal network call number format that is translated by the first service control point, into the new called party address, the new called party address having an international call number format.

17. The system of claim 16, wherein, in addition to the valid call number in the subscriber number profile the subscriber profile contains one of a service key and a service control point address of the service control point.

18. The system of claim 15, wherein, in addition to the valid call number, the subscriber number profile contains one of a service key and a service control point address of the service control point.

19. The system of claim 15, wherein an abbreviated call number is stored as the valid call number in the subscriber number profile.

20. The system of claim 19, wherein the mobile switching center sets up the new call connection with the mobile station using a service corresponding to the abbreviated call number.

21. The system of claim 19, wherein the mobile switching center sets up the new call connection with the mobile station to a mailbox corresponding to the abbreviated call number.

22. The system of claim 15, wherein the valid call number in the subscriber number profile is stored with one of a complete number of call number digits and an abbreviated number of call number digits, and wherein the valid call number is compared with a corresponding number of call number digits of the called party address.

23. The system of claim 15, wherein the first service control point is part of an intelligent network.

24. The system of claim 15, wherein the subscriber-oriented data includes service data, and wherein in the mobile switching center further comprises:
evaluation means for evaluating the service data for the valid call number from the subscriber number profile corresponding to the called party address, wherein the control means sets up the new call connection to a second service control point.

25. The system of claim 15, wherein the home mobile radio network further comprises:
execution means for executing an update procedure and storing the subscriber oriented data and the subscriber number profile from the first memory means into the second memory means.

26. The system of claim 15, wherein the visited mobile radio network further comprises:
execution means for executing an update procedure and storing the subscriber oriented data and the subscriber number profile from the first memory means into the second memory means.

27. The system of claim 15, wherein the subscriber number profile contains data for all subscribers registered in the home mobile radio network.

28. The system of claim 15, wherein the subscriber number profile contains a plurality of valid call numbers.

* * * * *